United States Patent [19]

Krajicek et al.

[11] Patent Number: 4,575,305
[45] Date of Patent: Mar. 11, 1986

[54] TRUCK MOUNTED TUBE BUNDLE PULLING APPARATUS

[75] Inventors: Richard W. Krajicek, Houston, Tex.; Steven W. Krajicek; Robert R. Cradeur, both of Sulphur, La.

[73] Assignee: Bon Ton Rolle Limited, Houston, Tex.

[21] Appl. No.: 553,403

[22] Filed: Nov. 18, 1983

[51] Int. Cl.⁴ .................... B60P 1/00; B60P 11/00
[52] U.S. Cl. .................... 414/746; 414/501; 414/546
[58] Field of Search .................... 414/14, 20, 540, 541, 414/542, 546, 547, 680, 686, 687, 688, 690, 692, 708, 718, 722, 745, 746, 747, 23; 198/485, 750; 74/102, 519, 523; 212/184, 261, 264, 268, 189; 165/76

[56] References Cited

U.S. PATENT DOCUMENTS

| | | | |
|---|---|---|---|
| 199,836 | 1/1878 | Lawrence | 74/102 |
| 1,317,504 | 9/1919 | Keith | 414/734 |
| 2,550,183 | 4/1951 | Busch | 414/541 |
| 2,730,320 | 1/1956 | Srader | 248/647 |
| 2,990,072 | 6/1961 | Mindrum | 414/708 |
| 3,121,499 | 2/1964 | Barre, Jr. | 414/541 X |
| 3,174,634 | 3/1965 | Peck | 414/541 |
| 3,180,498 | 4/1965 | Postlewaite | 414/746 |
| 3,232,460 | 2/1966 | Rouse | 414/547 |
| 3,239,076 | 3/1966 | Huff et al. | 414/746 |
| 3,239,077 | 3/1966 | Huff et al. | 414/746 |
| 3,257,001 | 6/1966 | Postlewaite et al. | 414/746 |
| 3,335,879 | 8/1967 | Shaffer | 414/541 |
| 3,468,439 | 9/1969 | Olitsky et al. | 414/532 |
| 3,510,012 | 5/1970 | Van Meteren | 414/746 |
| 3,567,044 | 3/1971 | Travis | 414/746 |
| 3,616,728 | 11/1971 | Kennedy | 212/268 X |
| 3,658,191 | 4/1972 | Murphy | 414/746 |
| 3,685,673 | 8/1972 | Schweis | 414/547 |
| 3,726,421 | 4/1973 | Goldhofer | 414/547 |
| 3,765,544 | 10/1973 | Murphy | 414/746 |
| 3,836,015 | 9/1974 | Travis | 414/746 |
| 3,836,025 | 9/1974 | Olson et al. | 414/547 |
| 3,937,340 | 2/1976 | Grove | 414/23 X |
| 3,954,187 | 5/1976 | van der Woerd | 414/746 |
| 3,958,698 | 5/1976 | van der Woerd | 414/746 |
| 4,042,116 | 8/1977 | Bertolino | 414/747 |
| 4,172,688 | 10/1979 | Cecchi et al. | 414/747 |
| 4,199,299 | 4/1980 | Petitto St. | 414/687 |
| 4,227,854 | 10/1980 | Coffey | 414/746 |
| 4,274,796 | 6/1981 | Phillips | 414/690 |
| 4,280,783 | 7/1981 | Hayward | 414/686 |
| 4,306,832 | 12/1981 | Schmiesing | 414/728 X |
| 4,323,398 | 4/1982 | Simon | 134/18 |
| 4,382,743 | 5/1983 | Newell | 414/692 |
| 4,391,524 | 7/1983 | Bauch | 165/76 |
| 4,397,479 | 8/1983 | Schmidt | 212/189 X |

Primary Examiner—Leslie J. Paperner
Assistant Examiner—Lyle Kim
Attorney, Agent, or Firm—John R. Kirk, Jr.

[57] ABSTRACT

The apparatus for removing and reinserting tube bundles into heat exchanger shells features an over the road vehicle having a bed. A vertical telescoping column is rotatably mounted to the rear of the bed. A bundle support member having a longitudinal axis is mounted to the top of the telescoping column and is adapted for slidable movement horizontally relative to the telescoping column and is further adapted for placement at elevations below the truck bed. A carriage is mounted on the bundle support member and is adapted to receive the flanged end of a tube bundle and be driven horizontally along the bundle support member. An offloading mechanism connected to the vertical telescoping column can be used for selectively unloading and reloading a tube bundle from the bundle support member to an awaiting bundle dolly.

35 Claims, 8 Drawing Figures

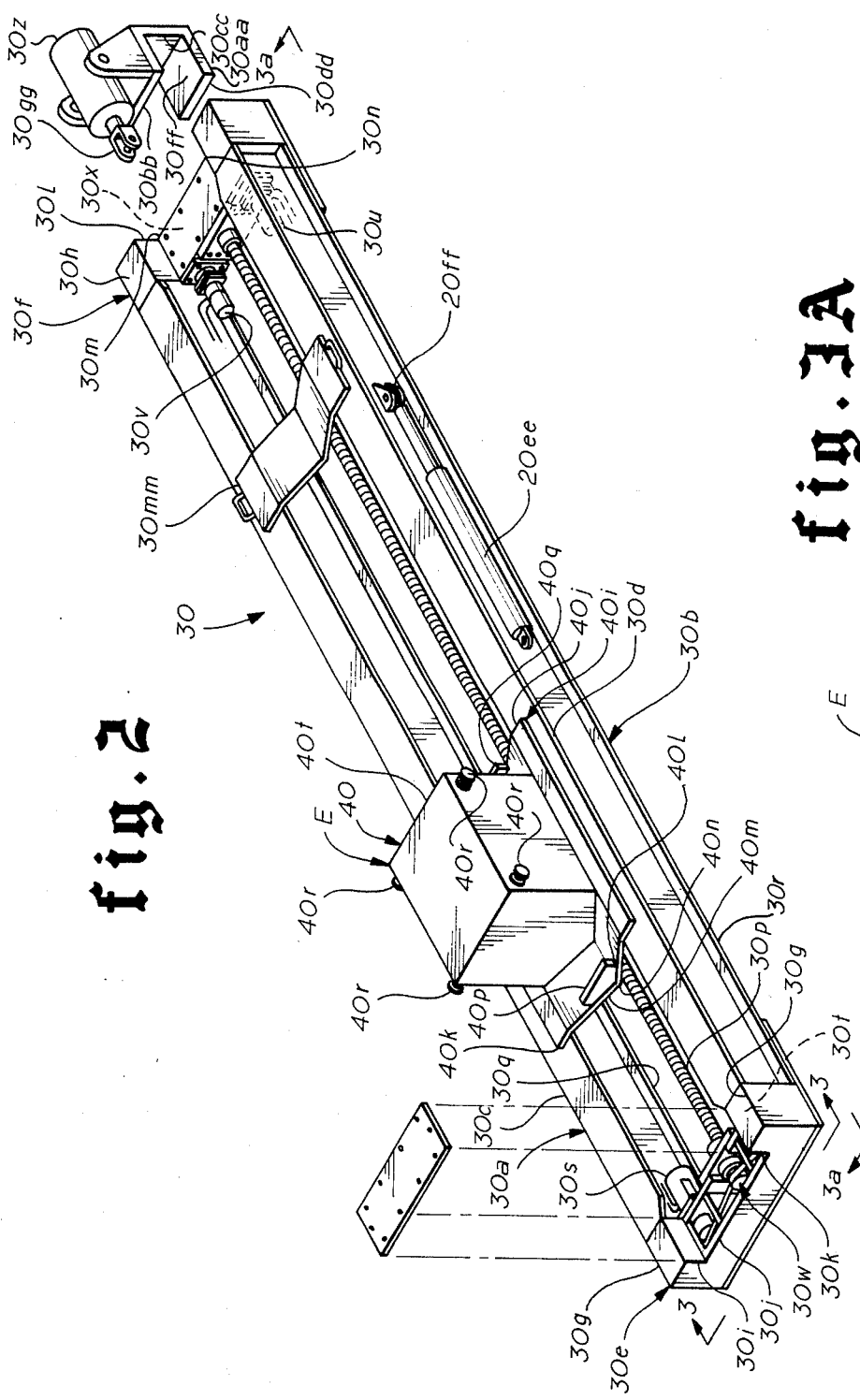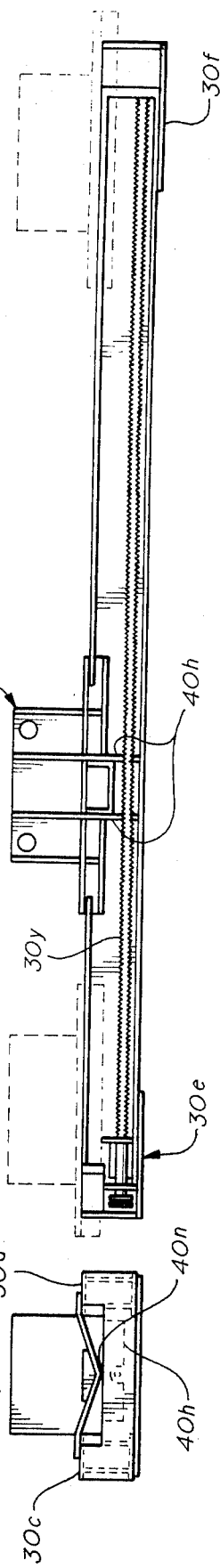

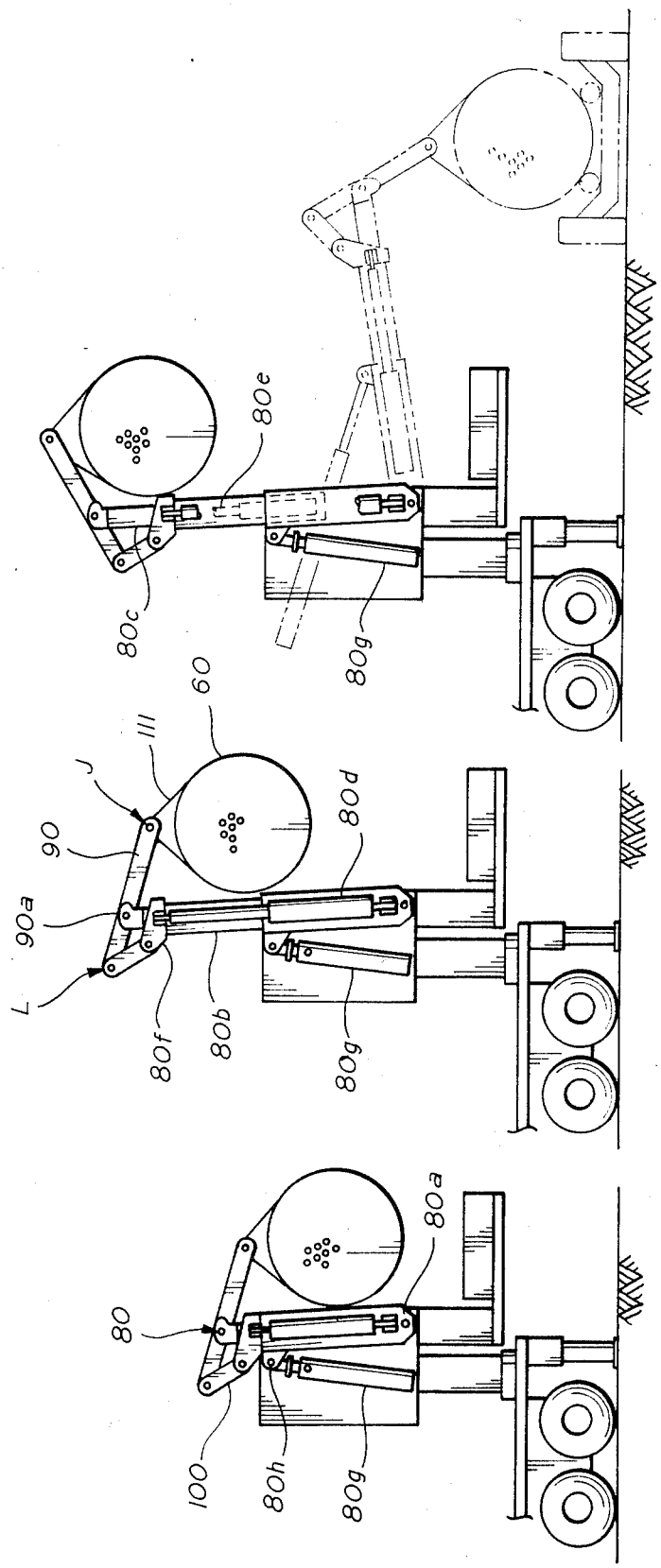

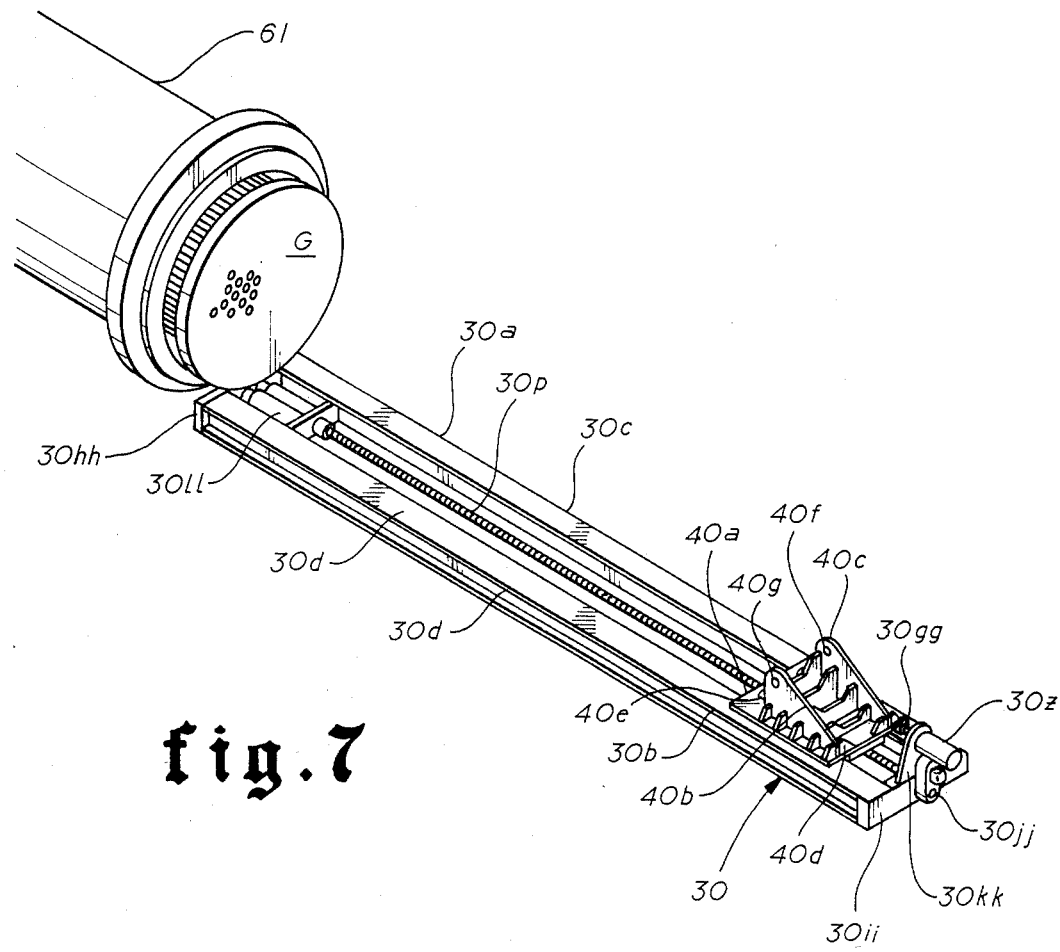

TRUCK MOUNTED TUBE BUNDLE PULLING APPARATUS

TECHNICAL FIELD OF THE INVENTION

The field of this invention relates to apparatus used for removing tube bundles from heat exchangers and reinstalling tube bundles into heat exchangers.

PRIOR ART

Shell and tube exchangers are manufactured in a variety of designs for use throughout the refining, chemical, petrochemical and other industries. One design features a removable tube bundle, thereby allowing access to the outside of the tubes for cleaning should the material flowing through the shell of the exchanger foul the outer surface of such tubes. In order to maintain the performance of a heat exchanger at close to design values, the tube bundles are periodically extracted from the shell and the fouling layer deposited on the outside and/or the inside of such tubes is removed. The tube bundles vary in diameter and length and some of the larger tube bundles can be as large as four and one half feet in diameter and twenty feet long and weigh as much as 40,000 pounds.

The tubes in the bundle may either be straight cut or U-shaped. The tube ends terminate in a tubesheet which is a highly machined thick disc of steel or alloy material which may also be drilled to be bolted up to a flange on the heat exchanger shell. Typically, a tubesheet is bolted between the heat exchanger shell flange and an end cap, although other designs are possible.

One prior art device illustrated as a bundle puller manufactured by Hydro-Extractors, Inc. features a device that is positioned next to an exchanger with a crane. The bundle puller has an elongated support carrying a long stroking hydraulic cylinder mounted thereon. The elongated support is slidably mounted on a frame and can be secured in any offset position along that frame. The end of the piston is secured to the tubesheet for pulling the bundle from the exchanger.

This device presents several drawbacks. Since tube bundles may be as long as twenty feet or more, it is not practical to provide a hydraulic cylinder with such a long stroke. Therefore, the devices of the prior art provided a hydraulic cylinder with a shorter stroke, about four feet, which requires that after each piston stroke, pulling the bundle out about four feet, the slidable support must be disconnected and reconnected from the frame before the hydraulic cylinder can pull the bundle out another four feet. The presence of hydraulic cylinders with such long stroke adds significant bulk to the device. Moreover, once the bundle is loaded onto the device, and before the device can be disconnected from a structure or the exchanger shell, there is always the problem that the tube bundle may not be properly centered on the device. Therefore, additional manpower is required to ensure that the device, with the bundle attached thereto, can hang perfectly level so that the bundle may safely be brought to the ground. Finally, after the tube bundle is withdrawn, it must be loaded on a truck or carried by the crane to a cleaning location. The tube bundle must be carried transverse to the direction of travel of the crane in order to allow the crane to properly support the heavy bundle without the danger of tipping over. Therefore, a wide path must exist from the point where the tube bundle is removed from the heat exchanger shell to the point where it is to be loaded on a truck to be driven to a cleaning station. Alternatively, the crane itself may be used to drive to the cleaning station while supporting the tube bundle.

Another prior art device is described in the Bauch U.S. Pat. No. 4,392,524 issued July, 1983. The Bauch device features a self-propelled chassis including a rotatably mounted vertical telescoping shaft with a bundle support member mounted to one side. A carriage, driven by four hydraulic motors along a rack, moves along the bundle support member and when attached to the tube bundle, pulls the bundle from the shell. Although the Bauch device can be used to easily remove a tube bundle from a shell, it does not obviate the need for a crane to be standing by in order to off-load or load the tube bundle from or to the bundle support member. Therefore, to a great extent, the economies achieved by using the Bauch device to remove a bundle from an exchanger are lost because a crane and crew must also be used before the recently removed bundle can be off-loaded onto a truck for transport to the tube cleaning station. Furthermore, as frequently occurs during refinery turnarounds, a great many exchangers are scheduled to have their tube bundles removed within a short period of time. In addition, during such turnarounds, a crane of the appropriate size and capacity may be tied up on other jobs. There may be so much activity related to the turnaround, around the heat exchanger whose bundle is to be pulled that making room for crane access may further increase the time required to complete the turnaround. Finally the Bauch device is not designed for over the road travel and must be carried on a trailer from job to job. The Bauch device is limited to pulling bundles from only one end of the bundle support assembly and thus may require additional maneuvering, and in some cases may not be able to reach a bundle due to such lack of maneuverability. The device of the present invention can remove bundles over either end of the bundle support member and travel at highway speeds when moving from one job to another.

The apparatus of the present invention does not envision the use of a separate crane in order to transport a bundle to the tube cleaning station. Instead, the off-loading and reloading mechanism provided with the device of the present invention permits the recently removed bundle to be transferred to and from a bundle dolly whereupon it may be towed to the tube cleaning station with a light truck or similar vehicle or the bundle can be driven to a cleaning station far removed from the plant site without offloading. The device of the present invention may be immediately redeployed for removal of yet another tube bundle thereby increasing the usefulness of the device as well as reducing the overall length of a turnaround.

SUMMARY OF THE INVENTION

The invention encompasses a device for removing and reinstalling tube bundles from and into heat exchanger shells. The device features an over the road vehicle with a bed having a pivotally mounted vertical telescoping column. A bundle support member is attached to one side near the top of the telescoping column. A carriage, which is connected to the tube bundle, is driven along the bundle support member thereby extracting or inserting the tube bundle over either end of said bundle support member and from exchangers mounted above and below the elevation of the bed.

Having fully removed a bundle from the shell of the exchanger onto the bundle support member, the off-loading mechanism picks up the bundle and loads it onto a bundle dolly so that it may be driven to a tube cleaning station. The off-loading mechanism comprises a pair of telescoping masts, with each mast being pivotally mounted from the telescoping column and further containing a lower, an upper and at least one intermediate section. A linkage connects the intermediate section with a boom pivotally mounted on the telescoping mast upper section. A stabilizer member serves as the pivot point between the boom and mast upper sections as well as to stabilize the off-loading mechanism by connecting the two upper sections together. By manipulating the hydraulic cylinders provided with the off-loading mechanism, the boom can be raised or lowered and both masts pivoted about their lower sections thereby permitting the bundle to be removed from the bundle support member and loaded on to a bundle dolly, or vice versa.

BRIEF DESCRIPTION OF THE DRAWINGS

FIG. 2 is an isometric view of the bundle support member and carriage.

FIG. 3 is an end view of the bundle support member and carriage shown in FIG. 2 taken along lines 3—3.

FIG. 3a is a side view of the bundle support member and carriage shown in FIG. 2 taken along lines 3a—3a.

FIG. 4 is a schematic side elevation of the off loading assembly in a fully contracted position.

FIG. 5 is a schematic side elevation of the off loading assembly showing the intermediate section extended thereby raising the bundle.

FIG. 6 shows the off loading assembly in two positions. The first position is a schematic side elevation illustrating the upper section being extended thereby actuating the linkage and raising the boom. The second position is a schematic elevation view showing the entire telescoping mast pivoted about the lower section thereby transferring the tube bundle to the bundle dolly.

FIG. 7 is an isometric view of an alternate embodiment of the bundle support member including the carriage and drive assembly for the carriage.

DESCRIPTION OF THE PREFERRED EMBODIMENT

Figure 1:
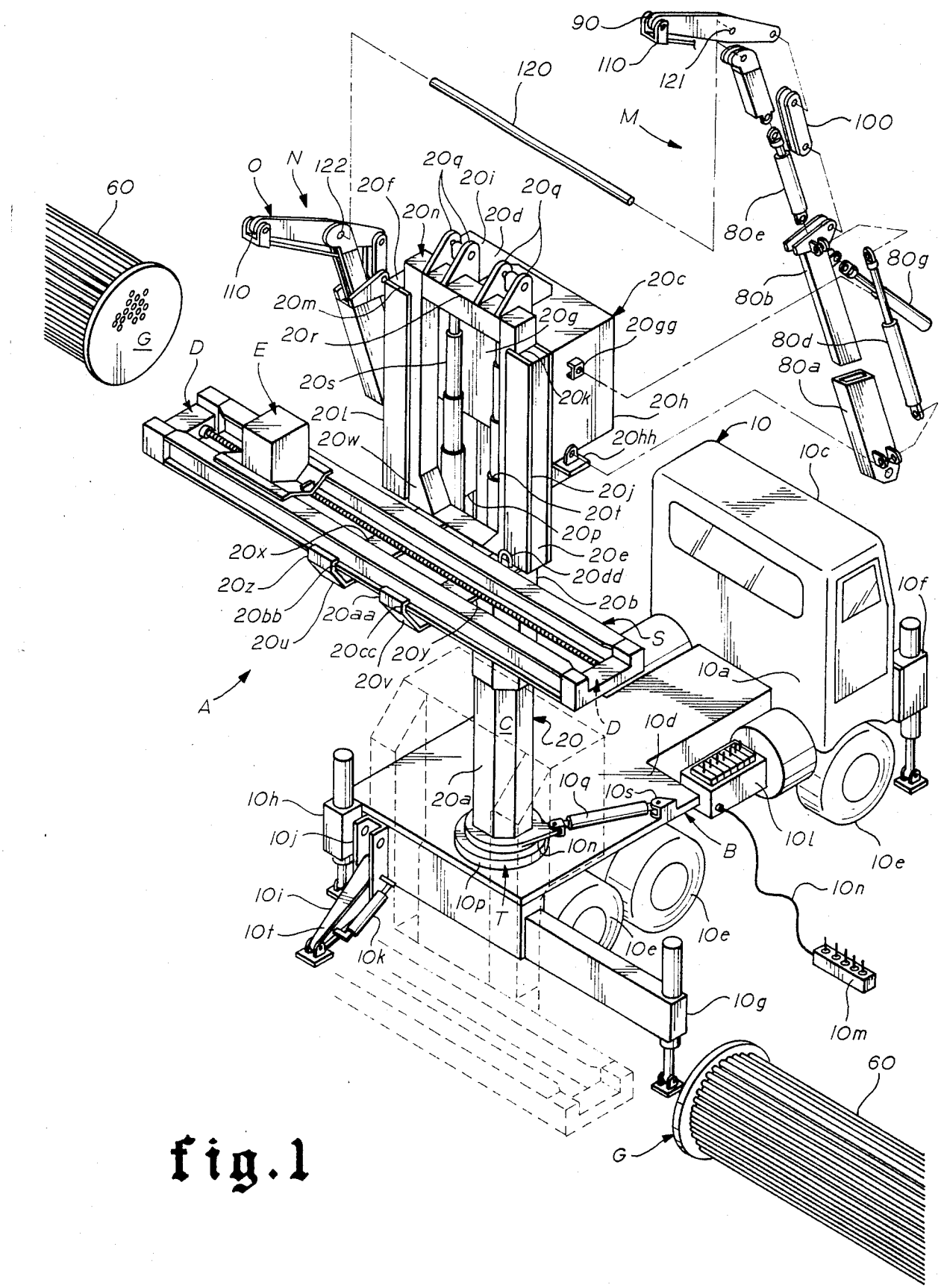
FIG. 1 is an isometric view showing the apparatus with the telescoping column fully extended and in its lowermost position in dashed lines. The off loading mechanism snown in an exploded view for clarity.

By way of definition, it is to be understood in the foregoing that references to hydraulic cylinders encompass the pistons included therein including all necessary controls and connecting lines required to make such cylinders operational. The hydraulic cylinders and the controls as used in this invention are of a type well known in the art.

Turning to FIG. 1, the bundle pulling apparatus A is composed of the following elements: a base B; a rotatably mounted vertical telescoping column ("column") C; a turntable T connecting telescoping column C to base B; a bundle support member S mounted to one side of telescoping column C near its top; a carriage E driven by carriage drive means D along bundle support member S; and an off-loading mechanism O for loading a tube bundle 60 onto bundle dolly H (FIG. 6) from bundle support member S and vice versa.

The base B is an over the road vehicle or truck 10 which is specifically adapted to accept the other portions of the apparatus A. The truck 10 has an engine 10a which drives a hydraulic pump 10b. The truck 10 also contains a cab 10c from which the truck 10 may be steered and a bed 10d supported on a frame (not shown) behind cab 10c.

Before the bundle pulling apparatus A can be used the truck 10 must be properly positioned adjacent the tube bundle 60 to be removed. In order to use the bundle pulling apparatus A, the load imposed on the wheels 10e of the truck 10 must be removed from said wheels 10e and transferred directly to a stable ground surface. In order to accomplish this weight transfer a pair of lateral outriggers 10f (only one of which is visible in FIG. 1) are disposed at the front of truck 10 in front of cab 10c. Lateral outrigger 10g is mounted to the underside of the rear of bed 10d and is disposed to extend in a direction ninety degrees from the horizontal longitudinal axis of the bed 10d. Similarly, lateral outriggers 10f extend in a direction parallel to that of lateral outrigger 10g. Stationary support 10h is mounted at the rear of truck 10 adjacent to bed 10d near the opposite end of bed 10d from where lateral outrigger 10g is mounted. The purpose of stationary support 10h is also to shift the load of the apparatus A from wheels 10e to a stable grade surface. It is understood that lateral outriggers 10f and 10g as well as stationary support 10h are actuated hydraulically for vertical movement as well as for horizontal movement (in the case of lateral outriggers 10f and 10g). Adjacent stationary support 10h and mounted off the back of the truck 10 just below bed 10d is pivotally mounted longitudinal outrigger 10i. Pivotally mounted longitudinal outrigger 10i is connected to mounting bracket 10j. Longitudinal outrigger hydraulic cylinder 10k is connected between mounting bracket 10j and longitudinal outrigger 10i. Longitudinal outrigger hydraulic cylinder 10k can selectively move longitudinal outrigger 10i downwardly thereby shifting the weight of the bundle pulling apparatus A directly to the ground, or upwardly for ground clearance when the truck 10 is travelling over the open roads. It is further understood that the lateral outriggers 10f and 10g as well as longitudinal outrigger 10i and stationary support 10h are of a design that is well known in the art.

The bundle pulling apparatus A includes a control console 10l mounted in truck 10 adjacent bed 10d. An operator may control the bundle pulling apparatus A by standing adjacent to control console 10l. In the alternative, by using cable 10n and remote control 10m connected to cable 10n, the operator may place himself at various locations around the bundle pulling apparatus while controlling it. The remote control 10m promotes safe operation of the bundle pulling apparatus A in that it allows the operator complete view around the bundle pulling apparatus A before initiating any of its movements.

As shown in FIG. 1, turntable T, also numbered 10p, is mounted onto bed 10d. Column C is mounted to the top of turntable 10p. Turntable hydraulic cylinder 10q connects turntable bracket 10r to bed bracket 10s. Therefore, turntable hydraulic cylinder 10q, when actuated, is capable of rotating turntable 10p through an angle of approximately 105°. As is readily apparent, turntable hydraulic cylinder 10q is used to retain column C in a given position after an initial rotation.

Having placed the bundle pulling apparatus A adjacent a tube bundle 60 and properly extended outriggers 10f, 10g, 10i as well as stationary support 10h, the bundle pulling apparatus A is ready for use. Vertical telescoping column C also number 20 has a base section 20a mounted on top of turntable 10p. Intermediate telescoping section 20b telescopes over base section 20a. It is understood that the preferred embodiment shows one intermediate telescoping section however, a design employing a plurality of intermediate telescoping sections is within the spirit of the invention. Top telescoping section 20c is adapted to telescope over the outside of intermediate telescoping section 20b. It is understood that the top telescoping section 20c and the intermediate telescoping section 20b are telescoped relative to base section 20a via a raising mechanism (not shown) located within vertical telescoping column 20 which is of a type well known in the art. Top telescoping section 20c has a box shaped upper segment 20d with structural members 20e and 20f connected thereto. Structural members 20e and 20f have a vertical, longitudinal axis which is parallel to the axis of vertical telescoping column 20. Structural members 20e and 20f are connected to end wall 20g of upper segment 20d with structural member 20e adjacent to wall 20h and structural member 20f adjacent to end wall 20i. End plate 20j is attached to structural member 20e on the opposite side from where structural member 20e is connected to wall 20g thereby defining guide groove 20k. End plate 20l is attached to structural member 20f on the opposite side from where structural member 20f is connected to wall 20g thereby forming guide groove 20m. Guide groove 20k is parallel to guide groove 20m.

Bundle support member vertical adjustment section 20n (FIG. 1) is disposed to move vertically within guide grooves 20k and 20m. A mounting plate 20p is secured to the lower end of top telescoping section 20c and disposed between vertical telescoping column 20 and guide grooves 20k and 20m. Bundle support member vertical adjustment section 20n contains four mounting lugs 20q attached to its upper end 20r and disposed to accept support member telescoping shaft 20s and 20t. Support member telescoping shafts 20s and 20t are each connected to mounting plate 20t. Therefore, on actuation of support member telescoping shafts 20s and 20t, bundle support member vertical adjustment section 20n can be moved vertically independent of the telescoping action of top telescoping section 20c and intermediate telescoping section 20b over base section 20a. It is understood that although the preferred embodiment discloses a pair of telescoping shafts 20s and 20t for vertical movement of bundle support member vertical adjustment section 20n relative to top telescoping section 20c, other devices well known in the art such as hydraulic cylinders or rack and pinions may also be used without departing from the spirit of the invention.

Offset support bracket 20u and offset support bracket 20v are connected to front wall 20w and extend horizontally therefrom. Top surface 20x is located on offset support bracket 20u and top surface 20y is located on offset support bracket 20v. Bracket 20z is mounted to offset support bracket 20u at the opposite end from where offset support bracket 20u is connected to front wall 20w. Similarly, bracket 20aa is mounted to offset support bracket 20v at the opposite end from where support bracket 20v is connected to front wall 20w. Brackets 20z and 20aa define guide grooves 20bb and 20cc, respectively. Guide grooves 20bb and 20cc guide the horizontal movement of bundle support member S along the top of top surfaces 20x and 20y. Mounting lug 20dd is located on top surface 20y adjacent front wall 20w. An alignment hydraulic cylinder 20ee (FIG. 2) is connected to mounting lug 20dd (connection not shown) and at the other end to mounting lug 20ff. Mounting lug 20ff is connected to bundle support member S. Therefore, horizontal movement of bundle support member S can be accomplished by extension or retraction of alignment hydraulic cylinder 20ee with guide grooves 20dd and 20cc acting to prevent rotation of bundle support member S in a horizontal plane.

Since vertical telescoping column 20 is mounted on turntable 10p which is in turn mounted at the rear of bed 10d (see dashed outline of bundle support member in FIG. 1), it is clear that when the longitudinal axis of bundle support member S is oriented at ninety degrees to the longitudinal horizontal axis of bed 10d, bundle support member S may be lowered below the elevation of the bed 10d. In order to lower bundle support member S below the elevation of bed 10d vertical telescoping column 20 must be in a fully contracted position wherein top telescoping section 20c and intermediate telescoping section 20b are fully lowered over base section 20a. Furthermore, support member telescoping shafts 20s and 20t must also be in their fully retracted position thereby lowering bundle support member vertical adjustment section 20n relative to top telescoping section 20c. As shown in FIG. 1, bundle support member vertical adjustment section 20n is disposed to move downwardly behind bed 10d and adjacent to mounting bracket 10j which holds pivotally mounted longitudinal outrigger 10i. Bundle support member vertical adjustment section 20n may move downwardly until bundle support member S comes into contact with top surface 10t of pivotally mounted longitudinal outrigger 10i.

The offloading assembly O is connected to top telescoping section 20c through two pairs of mounting brackets 20gg and 20hh disposed on end wall 20h (see FIG. 1) and end wall 20i (not shown).

Referring to FIG. 2, the bundle support member S also numbered 30 is basically a frame consisting of axially extending and spaced structural members 30a and 30b. Structural members 30a and 30b have top surfaces 30c and 30d, respectively. First end member 30e completes one end of the frame and second end member 30f completes the other end of the frame. First end member 30e has a top surface 30g which is in the same plane as upper planar surfaces 30c and 30d. Similarly, second end member 30f has a top surface 30h in the same plane as upper planar surfaces 30c and 30d. First end member 30e has an elongated notch defined by surfaces 30i, 30j and 30k. Similarly, second end member 30f has an elongated notch defined by surfaces 30l, 30m and 30n. A drive screw 30p, which is a rotatably mounted threaded shaft, extends from first end member 30e to second end member 30f between structural member 30a and 30b and between upper planar surfaces 30c and 30d and lower planar surfaces 30q and 30r of structural members 30a and 30b. The drive screw 30p is rotated by two hydraulic reversible motors 30s and 30t supported by the first end member 30a and two hydraulic reversible motors 30u and 30v supported by the second end member 30f. Hydraulic reversible motors 30s and 30t are operably connected to drive drive screw 30p via chain and sprocket assembly 30w. Similarly, hydraulic reversible motors 30u and 30v are operably connected to drive drive screw 30p via chain and sprocket assembly 30x located within second end member 30f.

Referring to FIGS. 3 and 3a, it can be seen that carriage E has a yoke 40h which is in contact with the threads 30y on drive screw 30p. As shown in FIG. 2, hydraulic reversible motors 30s, 30t, 30u and 30v are disposed between structural members 30a and 30b between upper planar surfaces 30c and 30d and lower planar surfaces 30q and 30r. Therefore, as shown by the dotted lines in FIG. 3a the carriage E is driven along upper planar surfaces 30c and 30d due to the interaction of threads 30y of drive screw 30p with yoke 40h when drive screw 30p is driven by hydraulic reversible motors 30s, 30t, 30u and 30v.

As can also be seen from FIG. 3a, the carriage 30e is free to travel from over top surface 30g on first end member 30e to over top surface 30h of second end member 30f. As will be further described hereinbelow, the ability of carriage E to travel and partially overhang top surfaces 30g and 30h, allows a tube bundle 60 to be removed via carriage E over first end member 30e or second end member 30f. The ability to remove tube bundles from over either end of bundle support member S imparts a distinct advantage to the apparatus not found in devices in the prior art. Prior art devices have bundle support members suitable for removing heat exhanger bundles from only one end. As a result, when attempting to position the bundle extraction apparatus adjacent a heat exchanger tube bundle to be pulled, a considerable amount of room was required in order to properly position the base to orient the bundle support member in position for removing a tube bundle. In situations that did not allow unrestricted room for maneuvering the base of the apparatus for alignment of the bundle support member, the self-propelled base of the prior art devices had to be backed in when approaching the heat exchanger instead of being driven head on adjacent to the heat exchanger. The main reason for this drawback is that in prior art bundle pulling apparatuses the bundle support member could only withdraw bundles from over one end and the vertical telescoping column could only be rotated approximately ninety degrees. In the device of the present invention, however, although the vertical telescoping column 20 may only be rotated through one-hundred five degrees via turntable hydraulic cylinder 10q, the truck 10 may always be driven head on adjacent to the heat exchanger 61 because the carriage E is adapted to remove tube bundle 60 from over first end member 30e or second end member 30f.

Although four hydraulic reversible motors 30s, 30t, 30u and 30v have been shown to drive drive screw 30p, combination employing fewer or greater hydraulic reversible motors are within the spirit of the invention. It is important to note that the placement of hydraulic reversible motors 30s, 30t, 30u and 30v so as not to impede carriage E from moving from over first end member 30e to over second end member 30f is an important factor which allows carriage E to remove tube bundle 60 from either end of bundle support member S.

A bundle breakout hydraulic cylinder 30z is pivotally mounted to C-shaped bracket 30aa. Bracket 30aa has an upper horizontal mounting surface 30bb adjacent vertical surface 30cc and a lower horizontal mounting surface 30dd connected to vertical mounting surface 30cc. Taken together surfaces 30bb, 30cc and 30dd define notch 30ff. Therefore, bundle breakout hydraulic cylinder 30z may be secured to first end member 30e or second end member 30f by the mountably connecting bracket 30aa to either surface 30j on first end member 30e or surface 30m of second end member 30f. As can readily be seen from FIG. 2, notch 30ff envelopes either first end member 30 or second end member 30f by allowing bracket 30aa to slip into the elongated notch found in first end member 30e or second end member 30f.

Fastening eyes 30gg are connected to the end of bundle breakout hydraulic cylinder 30z. In certain instances the tube bundle 60 due to accumulated sludge buildup may not be readily removable from heat exchanger 61. In that event, rather than connecting the carriage E to the tube bundle 60 and attempting to pry the bundle loose, bundle breakout hydraulic cylinder 30z is employed. A cable (not shown) is attached to fastening eyes 30gg and connected to the tube bundle 60. The bundle breakout hydraulic cylinder 30z is activated thereby intially moving tube bundle 60 out of heat exchanger 61. Having initially moved the tube bundle 60 out of exchanger 61 the carriage E may be used to remove the bundle 60 completely out of heat exchanger 61, as more fully described hereinbelow.

An alternate embodiment of the bundle support member S is shown in FIG. 7. As in FIGS. 2 and 3 the alternate embodiment of FIG. 7 has a frame consisting of a pair of axially extending and spaced structural members 30a and 30b. A drive screw 30p is disposed between structural member 30a and 30b and extends from end 30hh to end 30ii. A reversible hydraulic drive motor 30jj is mounted on end plate 30ii for rotating drive screw 30p. A bundle breakout hydraulic cylinder 30z is mounted to bracket 30kk which is in turn connected to end plate 30ii. Bundle breakout hydraulic cylinder 30z, shown in FIG. 7, is mounted directly above hydraulic reversible motor 30jj. Fastening eyes 30gg are connected to bundle breakout hydraulic cylinder 30z. The bundle breakout hydraulic cylinder functions in the same manner as described hereinabove in the description of the embodiment shown in FIGS. 2 and 3.

A pair of frame mounted rollers 30ll (FIG. 7) are mounted within bundle support member 30 adjacent to end 30hh and at the opposite end of bundle support member 30 from where hydraulic reversible motor 30jj is mounted. Frame mounted rollers 30ll are disposed to be extended upwardly above structural members 30a and 30b through the action of a pair of hydraulic cylinders (not shown). The frame mounted rollers 30ll have a longitudinal axis parallel to the horizontal longitudinal axis of bundle support member 30. After the carriage E has pulled a substantial portion of a tube bundle 60 from within the heat exchanger shell 61, frame mounted rollers 30ll are extended to support the tube bundle 60 as its back end is withdrawn from the exohanqer shell 61. The frame mounted rollers 30ll prevent any damage to the tube ends by supporting the bundle so that it does not drop as the tube ends clear the end of the heat exchanger shell 61.

Similarly, referring to FIG. 2 slide plate 30mm serves the same function as rollers 30ll in FIG. 7. However, due to the unique construction of the embodiment shown in FIG. 2 a slide plate 30mm which merely rests on upper planar surfaces 30c and 30d is sufficient to support the rear end of tube bundle 60 without any need for hydraulic cylinders to manipulate slide plate 30mm in a vertical direction.

Referring to FIG. 7, carriage E, also numbered 40, has a base plate 40a which bears directly on upper planar surfaces 30c and 30d. Extending vertically from base plate 40a are two vertical members 40b and 40c.

Vertical support members 40b and 40c are mounted in a plane parallel to the direction of motion of carriage 40 along bundle support member 30. A series of vertically mounted parallel stiffeners 40d extend between vertical support members 40b and 40c. A pair of fixed rollers 40e having a longitudinal axis parallel to the longitudinal axis of bundle support member 30 are mounted on the carriage 40 in front of stiffeners 40d and adapted to extend through base plate 40a, for supporting tubesheet G of the tube bundle 60. Pulling eyes 40f and 40g are used to initially remove a tube bundle 60 a few feet from the exchanger shell 61 via a cable (not shown) attached between eyes 40f and 40g and the tubesheet G. A stop (not shown) is provided on base plate 40a to engage the tubesheet G and retain it on fixed rollers 40e when the carriage 40 pulls the tube bundle 61 out of the exchanger over end 30hh. The underside of carriage 40 is adapted to engage drive screw 30p so that rotation of said screw 30p is translated to horizontal motion of carriage 40 along bundle support member 30 at a speed of up to six feet per minute.

FIG. 2 shows an alternate embodiment of carriage 40 including a base plate 40i which comprises two flat segments 40j and 40k whose longitudinal axis are parallel with the longitudinal axis of structrual members 30a and 30b. Flat segments 40j and 40k rest on upper planar surfaces 30d and 30c, respectively. Disposed between flat segments 40j and 40k are tapered segments 40l and 40m. Tapered segments 40l and 40m meet in a valley 40n which extends in a direction parallel to the longitudinal axis of structural members 30a and 30b slightly below upper planar surfaces 30c and 30d (as shown in FIG. 3). Bundle stops 40p and 40q are disposed at either end of base plate 40i above valley 40n. The valley 40n formed by tapered segments 40l and 40m serves to centralize a tube bundle 60 as the carriage 40 moves along bundle support member 30. Bundle stops 40p and 40q are used to grip the tube sheet G and therefore retain tube bundle 60 to carriage 40 while the tube bundle 60 is removed from the exchanger shell 61. Bundle stop 40p is used when tube bundles are removed over first end member 30e and bundle stop 40q is used when pulling a tube bundle 60 over second end member 30f. Wall 40s is used to push a bundle 60 into an exchanger over first end member 30e and wall 40t is used to push a bundle 60 into an exchanger over second end member 30f.

After withdrawing the tube bundle 60 from the exchanger shell 61, the tube bundle 60 is raised or lowered, as needed, through the action of support member telescoping shafts 20s and 20t which can raise or lower bundle support member 30. Turntable hydraulic cylinder 10q is then used to align the longitudinal axis of bundle support member 30 with the longitudinal axis of the bed 10d. Vertical telescoping column 20 is placed in a fully retracted position by telescoping intermediate telescoping section 20b and top telescoping section 20c downwardly toward base section 20a. At that point, the bundle support member can be lowered until offset support brackets 20u and 20v come in contact with the bed 10d. It is understood that the previously described lowering functions and maneuvering functions can occur in any order the operator so chooses by using remote control 10m or the control console 10l. It is also understood that depending upon the position of bundle dolly H relative to truck bed 10d that the offloading mechanism O may be used to load or unload a tube bundle 60 from the bundle support member 30 when the bundle support member 30 is positioned transversely to the longitudinal axis of the over the road truck 10 and disposed below the elevation of bed 10d.

Having fully lowered the bundle support member 30 with tube bundle 60 supported therefrom, off-loading mechanism O of this invention is used to transfer tube bundle 60 from bundle support member 30 to bundle dolly H. Referring to FIG. 1, the off-loading mechanism O contains a first telescoping mast M and a second telescoping mast N (see FIG. 1). First telescoping mast M is identical in function to second telescoping mast N with the only difference being the placement of actuating hydraulic cylinders as more fully discussed hereinbelow. Therefore, the foregoing discussion, while directed at first telescoping mast M is intended to apply to second telescoping mast N unless otherwise stated.

First telescoping mast M also numbered 80 (FIGS. 4, 5, 6) contains a lower section 80a, an intermediate section 80b and an upper section 80c. Upper section 80c telescopes from within intermediate section 80b. Intermediate section 80b telescopes from within lower section 80a. Lower section 80a is pivotally connected to mounting bracket 20hh (see FIG. 1).

First telescoping mast 80 can be raised by using first hydraulic cylinder 80d and second hydraulic cylinder 80e. First hydraulic cylinder 80d is connected to lower section 80a and to intermediate section 80b at gusset 80f. Therefore, actuation of first hydraulic cylinder 80d raises intermediate section 80b and upper section 80c relative to lower section 80a. However, first hydraulic cylinder 80d does not impart any relative telescoping movement between intermediate section 80b and upper section 80c. A second hydraulic cylinder 80e is mounted inside first telescoping mast 80 and connected between intermediate section 80b and upper section 80c. Therefore, upper section 80c may be telescoped relative to intermediate section 80b by using second hydraulic cylinder 80e.

A boom 90 is pivotally mounted to the top of upper section 80c as more fully described hereinbelow. A linkage L comprising of rigid link 100 is pivotally connected at both ends to boom 90 and to gusset 80f which is rigidly connected to intermediate section 80b. Securing means J is located at the opposite end of boom 90 from the point where link 100 is pivotally connected thereto. Securing means J includes a shackle 110 (see FIG. 1) and a sling 111 which encircles tube bundle 60 and is secured to shackle 110. As can readily be seen from FIGS. 5 and 6, when the second hydraulic cylinder 80e is actuated to extend upper section 80c from intermediate section 80b, rigid link 100 exerts a downward force on boom 90 thereby pivoting boom 90 about pivotal connection 90a which in turn raises shackle 110 along with tube bundle 60 attached thereto via sling 111.

The first telescoping mast 80 is pivoted about mounting bracket 20hh via a third hydraulic cylinder 80g (see FIG. 6). The third hydraulic cylinder 80g is pivotally mounted between mounting bracket 20gg (see FIG. 1) and gusset 80h mounted near the top of lower section 80a. As seen in FIG. 6, actuation of third hydraulic cylinder 80g pivots first telescoping mast 80 thereby setting tube bundle 60 onto bundle dolly H. It should be noted that first hydraulic cylinder 80d, second hydraulic cylinder 80e and third hydraulic cylinder 80g can be operated in any order chosen by the operator either simultaneously or serially by manipulation of remote controls 10n or using control console 10l. As can be readily appreciated by one skilled in the art, first telescoping mast 80 is adapted to raise the tube bundle 60 vertically using first hydraulic cylinder 80d. The tube bundle 60 can be further raised vertically using second hydraulic cylinder 80e via linkage L thereby raising the shackle 110 on boom 90. Finally, the tube bundle can be set into bundle dolly H using third hydraulic cylinder 80g to pivot first telescoping mast 80.

As stated hereinabove, off-loading mechanism O contains a first telescoping mast M and a second telescoping mast N. A stabilizer member 120 (see FIG. 1) extends through a first circular opening 121 in upper section 80c of first telescoping mast M, as well as through a second circular opening 122 in upper section 80c of second telescoping mast N. Therefore, stabilizer member 120 serves not only a stabilizing function for off-loading mechanism O, but also as the shaft used in pivotally connecting a boom 90 to both first telescoping mast M and second telescoping mast N.

The bundle pulling apparatus A of the present invention is placed into service by driving the over the road truck 10 to a suitable location adjacent the heat exchanger whose bundle 60 is to be removed or inserted. Lateral outriggers 10f, 10g and pivotally mounted longitudinal outrigger 10i as well as stationary support 10h are actuated to shift the weight of the apparatus off of the wheels 10e of truck 10. Vertical telescoping column is extended and rotated until the longitudinal axis of bundle support member 30 is aligned with the longitudinal axis of the heat exchanger. At that time upper planar surfaces 30c and 30d are located just below tube sheet G of tube bundle 60. Assuming the tube bundle 60 is not stuck in exchanger shell 61 due to an accumulation of muck, the tube bundle 60 is initially pulled from exchanger shell 61 using a cable (not shown) connected between pulling eyes 40f and 40g (see FIG. 7) or lugs 40r (see FIG. 2) and tube sheet G. After pulling the tube bundle 60 a few feet from the exchanger shell 61, the cable connecting tube sheet G to pulling eyes 40f and 40g (FIG. 7) or lugs 40r (FIG. 2) is released. The bundle support member 30 is then lowered slightly and ajusted horizontally while the carriage 40 is advanced to a position over first end member 30e or second end member 30f as required. Using vertical telescoping column 20 and alignment hydraulic cylinder 20ee, the bundle support member 30 is positioned so that tube sheet G comes to rest on fixed rollers 40e (FIG. 7) or tapered segments 40l and 40m (FIG. 2) and is secured to the carriage by bundle stop 40p or 40q (FIG. 2). It should be noted that the bundle stops are not shown in FIG. 7. Hydraulic reversible motor 30jj (FIG. 7) or hydraulic reversible motors 30s, 30t, 30u and 30v (FIG. 2) can be actuated in tandem to continue the removal of the tube bundle 60 from the heat exchanger 61 by driving the carriage 40 along bundle support member 30. Just before the tube bundle 60 is fully removed from the shell, frame mounted rollers 30ll are extended (FIG. 7) or slide plate 30mm is placed on upper planar surfaces 30c and 30d (FIG. 2) in order to support the end of tube bundle 60. Having fully withdrawn the tube bundle 60 from the heat exchanger shell 61, vertical telescoping column 20 is rotated and retracted thereby aligning the longitudinal axis of the bundle support member 30 with the longitudinal axis of the bed 10d and allowing the bundle support member 30 to be lowered toward bed 10d until offset support brackets 20u and 20v come in contact with the bed 10d. Alternatively, vertical telescoping column 20 can be rotated to position the longitudinal axis of bundle support member 30 transversely to the longitudinal axis of bed 10d. Support member telescoping shafts 20s and 20t can be used to lower bundle support member 30 behind the bed 10d of truck 10 and to an elevation below the bed 10d. From either position described above, the offloading assembly O may be used to transfer the tube bundle 60 from bundle support member 30 to a waiting bundle dolly H. It should be noted that the bundle pulling apparatus A is suitable for removing tube bundles from heat exchangers having a ground clearance of as little as two feet.

As can readily be appreciated, using the procedures described hereinabove, the bundle pulling apparatus A can be used to remove or insert a tube bundle 60 from or into a heat exchanger shell. Furthermore, the device of the present invention may also be used to remove end bells from a heat exchanger shell prior to removing the tube bundle 60.

The foregoing disclosure and description of the invention are illustrative and explanatory thereof, and various changes in the size, shape and materials, as well as in the details of the illustrated construction may be made without departing from the spirit of the invention.

We claim:

1. An apparatus for removing tube bundles of shell and tube heat exchangers, said bundles having a tubesheet on at least one end and said exchanger having at least one flanged end cap, comprising:
   an over the road vehicle;
   a vertical telescoping column rotatably mounted to and extending from said vehicle, said column having a vertical axis, said column movable between an expanded and a retracted position;
   a top telescoping section slidably mounted to said vertical telescoping column;
   a bundle support member having a longitudinal horizontal axis mounted upon and adjacent to said telescoping column and adapted for slidable movement relative to said telescoping column;
   a carriage mounted with said bundle support member, said carriage adapted to receive the flanged end of a tube bundle and adapted to be driven horizontally along said bundle support member;
   means for displacing said carriage axially along said bundle support member; and
   means on said vertical telescoping column for selectively unloading and reloading a tube bundle from said bundle support member;
   a bundle support member vertical adjustment section connected to said top telescoping section and said bundle support member, disposed to move vertically relative to said top section, independently of the telescoping action relative to said base section;
   guide means with said top telescoping section for guiding vertical movements of said bundle support member vertical adjustment section; and
   bundle support member telescoping means with said guide means for vertical movements of said bundle support member vertical adjustment section relative to said top telescoping section.

2. The apparatus of claim 1, wherein:
   said bundle support member vertical adjustment section is adapted for placement of the bundle support member at elevations below the plane of said vehicle at which said vertical telescoping column is mounted.

3. The apparatus of claim 1, wherein said bundle support member vertical adjustment section further includes:
at least one offset support bracket, said bracket defining a horizontal planar surface adapted to receive and guide said bundle support member, whereupon when said vertical telescoping column is in a retracted position and said bundle support member vertical adjustment section is downwardly telescoped relative to said top telescoping section, said offset support bracket will support said bundle support member at a level below the plane of said vehicle at which said vertical telescoping column is mounted thereby allowing bundles to be removed from heat exchangers mounted at an elevation below said plane of said vehicle at which said vertical telescoping column is mounted.

4. The apparatus of claim 1, wherein:
said guide means is a pair of guide grooves;
said top telescoping section includes a mounting plate;
said bundle support member telescoping means further contains:
at least one support member telescoping shaft connected between said mounting plate and said bundle support member vertical adjustment section.

5. The apparatus of claim 1, wherein said carriage displacement means includes:
a rotatably mounted threaded shaft extending substantially the entire length of the horizontal longitudinal axis of said bundle support member and engaging said carriage;
rotating means mounted at each end of said bundle support member, within said bundle support member for rotating said threaded shaft, thereby selectively driving said carriage along said bundle support member.

6. The apparatus of claim 5 wherein:
said bundle support member includes a pair of axially extending and spaced structural members, said members define an upper planar surface on which said carriage is directly supported.

7. The apparatus of claim 6 wherein:
said threaded shaft is mounted within said bundle support member between said axially extending and spaced structural members;
said rotating means is mounted within said bundle support member between said axially extending and spaced structural members; and
said carriage is disposed to travel from end to end of said bundle support member thereby allowing said carriage to pull a tube bundle from either end of said bundle support member.

8. The apparatus of claim 7, wherein said bundle support member further includes:
a demountably attached bundle brakeout hydraulic cylinder;
said bundle support member is adapted to accept said bundle brakeout hydraulic cylinder at either end; and
fastening means are connected to said bundle brakeout hydraulic cylinder for attachment to a tube bundle thereby initially loosening a bundle from a heat exchanger shell and onto either end of said bundle support member.

9. The apparatus of claim 1, wherein said carriage displacement means includes:
a rotatably mounted threaded shaft extending substantially the entire length of said horizontal longitudinal axis of said bundle support member and engaging said carriage;
a hydraulic motor mounted on said bundle support member for rotating said threaded shaft, thereby selectively driving said carriage along said bundle support member.

10. The apparatus of claim 9 wherein:
said bundle support member includes a pair of axially extending and spaced structural members, said members defining an upper planar surface on which said carriage is directly supported.

11. The apparatus of claim 10, wherein:
said threaded shaft is mounted within said bundle support member between said axially extending and spaced structural members.

12. The apparatus of claim 11, wherein:
said bundle support member further includes:
a pair of frame mounted rollers, said frame mounted rollers mounted within said bundle support member near one end of said bundle support member, said rollers having a central axis parallel to said longitudinal axis of said bundle support member, and said frame mounted rollers disposed to be extended from within said bundle support member thereby allowing said rollers to support a tube bundle at the opposite end from the end supported by said carriage.

13. The apparatus of claim 12, wherein:
said bundle support member further includes a bundle breakout hydraulic cylinder mounted above and on the opposite end of said bundle support member from said retractable rollers; and,
fastening means connected to said bundle breakout hydraulic cylinder for attachment to a tubesheet or an end cap of a heat exchanger for initially loosening said bundle from a heat exchanger shell.

14. The apparatus of claim 1, wherein said vehicle further contains:
an engine; and,
a hydraulic pump driven by said engine.

15. The apparatus of claim 1, wherein said bundle support member further contains:
an alignment hydraulic cylinder for selectively horizontally displacing said bundle support member to align said bundle support member adjacent to a heat exchanger for removing or installing a tube bundle.

16. The apparatus of claim 1, wherein:
a turntable is mounted to said vehicle connecting said vehicle and said telescoping column; and,
a turntable hydraulic cylinder is connected between said vehicle and said turntable for rotating said column through approximately 105° about its vertical axis.

17. The apparatus of claim 1, wherein:
a vehicle including a bed; and
said bundle support member can virtually rest on said bed when said telescoping column is fully retracted with said bundle support member vertical adjustment section fully extended relative to said top section and with said longitudinal axis of said bundle support member parallel to the longitudinal axis of said bed.

18. The apparatus of claim 1, wherein said means for unloading and reloading a tube bundle from said support member include:

at least one telescoping mast pivotally mounted to said vertical telescoping column;

pivoting means mounted to said vertical telescoping column for selectively pivoting said mast relative to said vertical telescoping column;

a boom pivotally connected to said mast;

securing means on said boom for connecting a load to said boom;

raising means for selectively extending or retracting said telescoping mast; and linkage means mounted to said mast for pivoting said boom about said mast when said raising means selectively extends or retracts an upper mast section.

19. The apparatus of claim 18, wherein said telescoping mast further contains:

a lower section pivotally connected to said vertical telescoping column;

at least one intermediate section slidably mounted to selectively extend or retract from said lower mast section;

an upper section slidably mounted to selectively extend or retract from said intermediate mast section;

said boom is pivotally mounted to said upper section of said mast; and said linkage means is mounted to said intermediate mast section.

20. The apparatus of claim 19, wherein:

said raising means includes at least one hydraulic cylinder.

21. The apparatus of claim 20, wherein said raising means includes:

a first hydraulic cylinder is connected between said lower section and said intermediate section for selectively extending and retracting said intermediate section from within said lower section; and a second hydraulic cylinder is connected between said intermediate section and said upper section for selectively extending and retracting said upper section from within said intermediate section.

22. The apparatus of claim 21, wherein:

said pivoting means a third hydraulic cylinder, said third hydraulic cylinder being pivotally connected to said bundle support member and said lower section of said mast.

23. The apparatus of claim 22, wherein:

said first hydraulic cylinder is mounted outside said mast; and said second hydraulic cylinder is mounted inside said mast.

24. The apparatus of claim 23, wherein:

said linkage means is a linkage containing at least one rigid link wherein the ends of said linkage are pivotally connected to said intermediate section and to said boom, whereupon actuation of said second hydraulic cylinder said boom can be selectively pivoted about said upper section of said mast.

25. The apparatus of claim 24, including:

a first telescoping mast;

a second telescoping mast; and a stabilizer member, said stabilizer member connecting said upper section of said first telescoping mast to said upper section of said second telescoping mast.

26. The apparatus of claim 25, wherein:

said upper section of said first telescoping mast is formed having a first circular opening;

said upper section of said second telescoping shaft is formed having a second circular opening; and, said stabilizer member extends through said first and second circular openings thereby serving as a shaft for pivotally mounting a boom to said upper mast section.

27. The apparatus of claim 26, wherein:

said securing means contains a shackle, said shackle located at the opposite end of said boom from where said linkage means is connected to said boom; and said securing means further contains a sling, said sling adapted to encircle a heat exchanger bundle and to be secured to said shackle.

28. The apparatus of claim 24, including:

a first telescoping mast;

a second telescoping mast; and a stabilizer member, said stabilizer member connecting said upper section of said first telescoping mast to said upper section of said second telescoping mast.

29. The apparatus of claim 28, wherein:

said upper section of said first telescoping mast is formed having a first circular opening;

said upper section of said second telescoping shaft is formed having a second circular opening; and, said stabilizer member extends through said first and second circular openings thereby serving as a shaft for pivotally mounting a boom to said upper mast section.

30. The apparatus of claim 18, further containing:

a shackle, said shackle located at the opposite end of said boom from where said linkage means is connected to said boom; and a sling, said sling adpated to encircle a heat exhchanger bundle and to be secured to said shackle.

31. A tube bundle support assembly for use in pulling out and reinserting tube bundles from heat exchangers, comprising:

a frame, said frame further comprising:

a plurality of axially extending and spaced structural members, said members defining an upper planar surface and a lower planar surface;

a first end member, said first end member is formed having a first elongated notch said first elongated notch extending downwardly from said upper surface of said first end member and terminating in a flat surface on said first end member and said first end member connected to said spaced structural members and said first end member having an upper surface aligned with said upper planar surface of said structural members;

a second end member, said second end member is formed having a second elongated notch, said second elongated notch extending downwardly from said upper surface of said second end member and terminating in a flat surface on said second end member, and said second end member connected to the ends of said spaced structural members opposite said first end member and having an upper surface aligned with said upper planar surface of said structural members;

a drive screw, said screw extending from said first end member to said second end member;

drive means for rotating said drive screw, said drive means supported by said frame;

a carriage, said carriage supported on said upper planar surface of said structural members, said carriage connected to said drive screw whereupon rotation of said drive screw by said drive means said carriage can selectively be moved from over said first end member to over said second end member thereby allowing a tube bundle to be removed or inserted from an exchanger from either end of said frame;

a bundle breakout hydraulic cylinder; and a mounting bracket, said mounting bracket disposed to support said bundle breakout hydraulic cylinder in alignment with the longitudinal axis of said frame, said bracket adapted to be demountably attached selectively to said first or second elongated notch thereby allowing a bundle to be initially removed from a shell of a heat exchanger selectively over said first end member or said second end member.

32. The assembly of claim 31, wherein:

said drive means is supported by said first end member and said second end member and includes:

at least one first end motor mounted in said first end member;

at least one second end motor mounted in said second end member;

means for transferring rotary motion from said first end motor to said drive screw; and, means for transferring rotary motion from said second end member to said drive screw.

33. The assembly of claim 31, wherein said carriage includes:

a base plate, said base plate further comprising:

a pair of flat segments, said flat segments aligned with the longitudinal axis of said frame at both ends of said base plate, said flat segments being in contact with the upper planar surface of said axially extending and spaced structural members, thereby supporting said carriage on said structural members;

a plurality of tapered segments between said flat segments, said tapered segments forming a valley, said valley having a central axis in alignment with the longitudinal axis of said frame, thereby preventing lateral movement of a heat exchanger bundle as it is removed or inserted; and a plurality of bundle stops mounted transversely to said valley at either end of said base plate to secure a heat exchanger bundle to either end of said carriage.

34. The assembly of claim 32, wherein:

said first end motor is a hydraulic reversible motor; and, said second end motor is a hydraulic reversible motor.

35. The assembly of claim 34, including:

two first end motors;

two second end motors;

said means for transferring rotary motion from said first end motors to said drive screw includes a first chain and sprocket assembly; and said means for transferring rotary motion from said second end motors to said drive screw includes a second chain and sprocket assembly.

* * * * *